United States Patent
Zhang et al.

(10) Patent No.: US 12,360,583 B2
(45) Date of Patent: Jul. 15, 2025

(54) PSEUDO-SLEEP MODE FOR NETWORKING DEVICES

(71) Applicant: HEWLETT PACKARD ENTERPRISE DEVELOPMENT LP, Spring, TX (US)

(72) Inventors: Xingzhao Zhang, Beijing (CN); Yinzhi Dong, Tianjin (CN); Jia Li, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 3 days.

(21) Appl. No.: 18/361,183

(22) Filed: Jul. 28, 2023

(65) Prior Publication Data
US 2025/0036185 A1    Jan. 30, 2025

(51) Int. Cl.
*G06F 1/3228* (2019.01)
*G06F 1/3209* (2019.01)
*H04L 12/12* (2006.01)

(52) U.S. Cl.
CPC .......... *G06F 1/3228* (2013.01); *G06F 1/3209* (2013.01); *H04L 12/12* (2013.01); *Y02D 30/50* (2020.08)

(58) Field of Classification Search
CPC ..... G06F 1/3228; G06F 1/3209; H04L 12/12; Y02D 30/50
See application file for complete search history.

(56) References Cited

U.S. PATENT DOCUMENTS

| | | | |
|---|---|---|---|
| 7,039,819 B1* | 5/2006 | Kommrusch | G06F 1/3287 713/320 |
| 7,738,413 B2 | 6/2010 | Varaiya et al. | |
| 9,591,564 B2 | 3/2017 | Salem et al. | |
| 10,194,264 B2 | 1/2019 | Azevedo et al. | |
| 10,609,711 B1 | 3/2020 | Ma et al. | |
| 2010/0067422 A1 | 3/2010 | Kadous et al. | |
| 2010/0232389 A1 | 9/2010 | Park | |
| 2011/0314314 A1* | 12/2011 | Sengupta | G06F 1/3228 713/323 |
| 2012/0210112 A1* | 8/2012 | Suganami | H04L 12/12 713/323 |
| 2020/0167724 A1 | 5/2020 | Klitenik et al. | |
| 2021/0157382 A1* | 5/2021 | Rangarajan | G06F 1/3287 |

FOREIGN PATENT DOCUMENTS

| | | |
|---|---|---|
| CA | 2660676 A1 | 9/2010 |
| EP | 3826368 A1 | 5/2021 |
| WO | 2021/162945 A1 | 8/2021 |

* cited by examiner

*Primary Examiner* — Terrell S Johnson
(74) *Attorney, Agent, or Firm* — Park, Vaughan, Fleming & Dowler LLP

(57) ABSTRACT

A networking device includes communication interfaces, a System-on-Chip (SoC), and pseudo-sleep mode logic. The SoC includes a processor, a memory, an internal PHY module, and other internal SoC modules. The pseudo-sleep mode logic is configured to detect receipt of a sleep command and, in response, cause the networking device to enter a pseudo-sleep mode in which the internal SoC modules are powered off, except for the internal PHY module, the processor, and the memory, which remain powered on. The logic is also configured to detect receipt of a wake command while the networking device is in the pseudo-sleep mode and, in response, cause the networking device to exit the pseudo-sleep mode.

20 Claims, 6 Drawing Sheets

PSEUDO-SLEEP MODE FOR NETWORKING DEVICES

INTRODUCTION

Networking devices, such as switches, routers, or access points, may comprise external communications interfaces to enable communication with other devices. Such external communications interfaces may include, for example, wired interfaces comprising ports into which communication cables can be removably connected, or a wireless interface comprising a radio transceiver. (External in this context refers to the capability of the interfaces to engage with electronic devices external to the networking device, but does not necessarily imply anything about the physical location of the interfaces; some external interfaces, such as a Wi-Fi interface, may be physically located on an interior of the networking device).

In addition, the networking devices may comprise control circuitry to control operations of the networking device. The control circuitry may include a processor, memory, and other modules/devices. Among these modules may be one or more "PHY", which comprise a chip or module that controls physical layer operations of a particular external communications interfaces—for example, a chip/module that controls the physical layer operations of an Ethernet interface may be referred to as an Ethernet PHY (or sometimes just a PHY). In some networking devices, some (or all) of the devices/modules that make up the control circuitry may be provided as part of a system-on-chip (SoC). An SoC is an integrated circuit (IC) that integrates a CPU, memory, and various other components of a system together as part of the same IC (i.e., with all the components formed on/in the same chip or die), as opposed to these components being provided as separate and distinct IC's that are connected together (e.g., via mounting to a motherboard).

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
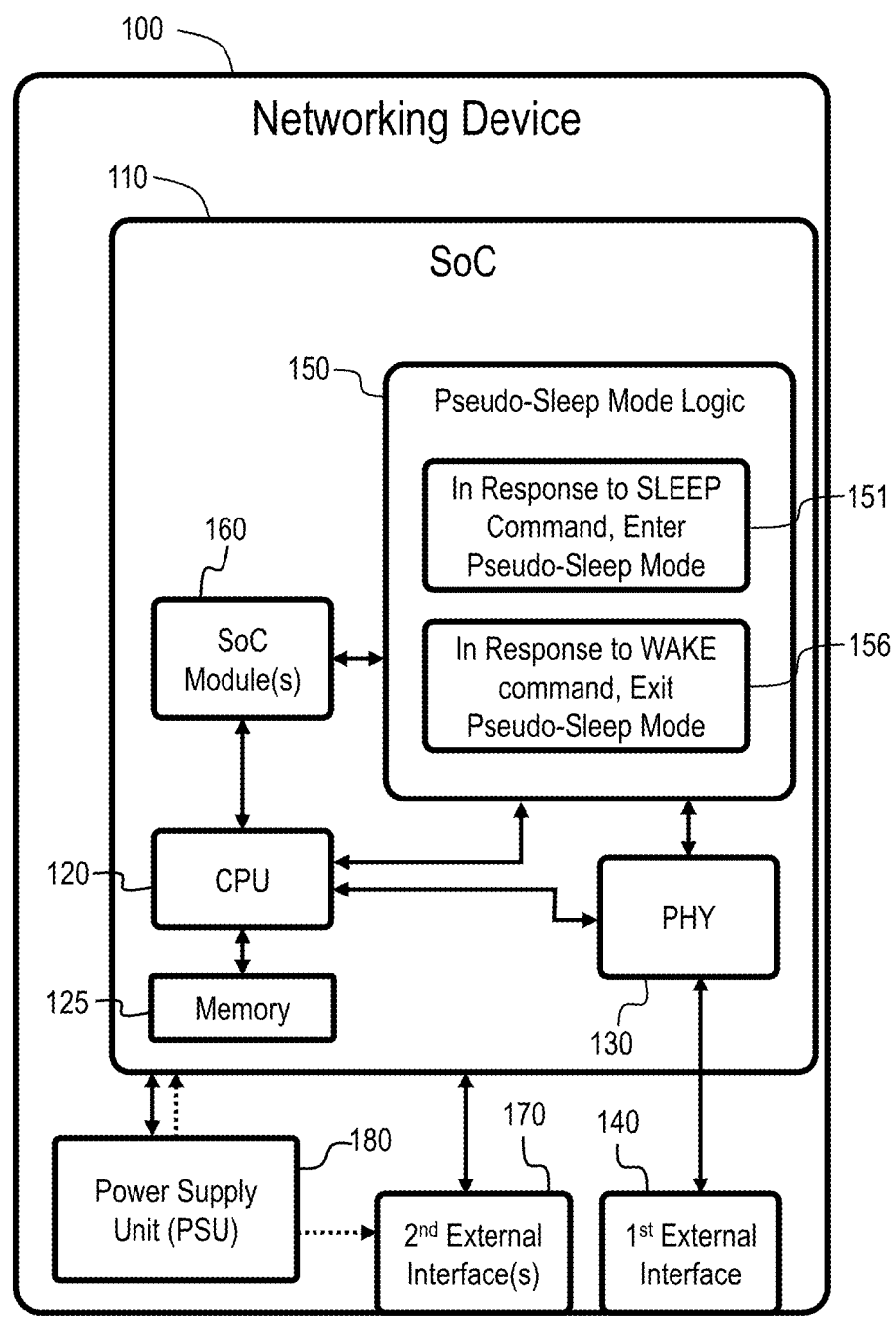
FIG. 1 is a block diagram illustrating an example networking device.

Networking devices may consume power even when lightly loaded (sending/receiving few communications) or not loaded at all (sending/receiving no communications). This power consumption may be attributable, in part, to the control circuitry of the networking device. In particular, the SoC of the networking device may draw some power even if little or no communications are passing through the networking device. To reduce such wasteful power usage, some networking devices have been provided with a sleep mode, which when entered causes the networking device to power off its SoC. As noted above, the SoC is one of the chief contributors to wasteful power consumption, and thus by powering off the SoC the power consumption of the device can be reduced. In the sleep mode, a PHY of the networking device, which is separate from the SoC, may remain powered on to monitor for a WAKE command, which when received causes the networking device to exit sleep mode and power up the SoC. Thus, for example, a network may place one or more of its networking devices in sleep mode when they are not needed and then may wake back up those devices when needed. This type of sleep mode may also be referred to herein as a "full sleep mode."

While the full sleep mode can be effective at reducing wasteful power consumption in those devices capable of utilizing it, not all networking devices are capable of utilizing the full sleep mode. In particular, the full sleep mode described above generally requires a discrete PHY chip that is external to the SoC. Such PHY are referred to herein as "external PHY." But some networking devices do not have such an external PHY, instead utilizing a PHY module which is integral to the SoC. Such PHY that are integral to the SoC may be referred to herein as "internal PHY" or "integral PHY." Such devices that lack a discrete external PHY and instead utilize an internal PHY integral to the SoC cannot use the full sleep mode described above because in the full sleep mode the entire SoC is powered off, which means that the integral PHY module which is part of the SoC is also powered off and therefore the external communications interface controlled by the PHY would no longer be operational. Consequently, the device could not receive any communications, including the WAKE command, and thus the device could not be awoken from the sleep mode. In contrast, the networking device which has an external PHY can safely power off its entire SoC in the full sleep mode because the external PHY (which is not part of the SoC) can remain powered on and thus enable receipt of a WAKE command. Accordingly, the full sleep mode described above works for networking devices that have a discrete external PHY but not for devices that have an internal PHY integral to the SoC. (As used herein, the terms "external" and "internal" when applied to the PHY should be understood as describing the relationship of the PHY to the SoC, but not as implying anything about the location of the PHY relative to the exterior/interior of the networking device itself).

Moreover, adding an external PHY to networking devices that lack one may increase the cost and complexity of the networking device, and thus in some circumstances this may not be a feasible solution to the problems noted above. Not only is the cost of the external PHY itself an issue, but adding the external PHY may also require redesigning a system circuit board or other components of the system, which can be quite expensive. Thus, generally it is high-end networking devices (i.e., devices that are more expensive, more performant, and/or more fully featured) that have an external dedicated PHY, while more value-oriented networking devices (i.e., devices that are less expensive, less performant, and/or less fully featured) tend to lack such an external PHY to keep costs low. The addition of an external PHY to an otherwise value-oriented networking device may raise the costs of the product beyond the level that customers would be willing to pay for a value-oriented product. Thus, there is a need for a power saving feature that can be utilized in networking devices that lack an external PHY and which does not significantly increase the costs of the networking device.

To address the issues described above, examples disclosed herein provide a pseudo-sleep mode for networking devices that lack an external PHY, which can be entered into to provide reduced power consumption for the networking device. In the pseudo-sleep mode, the internal modules of the SoC are powered down, except for an internal PHY integral to the SoC, the processor, and the memory, which remained powered on. The internal PHY that remains powered on is the one that controls an external communications interface over which the WAKE command is sent. As a result of shutting down the SoC modules, the overall power consumption of SoC can be greatly reduced. However, unlike the full sleep mode described above, in the pseudo-sleep mode power is not removed from the entire SoC (this is why it is referred to herein as "pseudo" sleep mode). As noted above, the internal PHY remains powered on and thus the WAKE command can still be received by the networking device over the external communications interface controlled by the internal PHY.

Moreover, in some examples, the pseudo sleep mode can be integrated into a networking device relatively inexpensively. For example, in some implementations the pseudo sleep mode can be integrated into a networking device via software and/or firmware update without the addition of any new hardware components to the system and without requiring a redesign of the system board. This may enable even relatively low-cost networking devices to benefit from a power saving pseudo-sleep mode.

In addition, in some examples the pseudo-sleep mode also comprises, in addition to powering of internal SoC modules, powering off external communications interfaces that are unneeded. For example, in some implementations all external communications interfaces other than the one interface over which the WAKE command is communicated may be powered off (in some example, this same interface is also used for communication of a SLEEP command). For instance, in one example the networking device comprises external communications interfaces including an Ethernet communications interface through which the WAKE command is communicated, a USB communications interface, and a Wi-Fi communications interface, and in such an example entering the pseudo sleep mode may include powering off the USB interface and the Wi-Fi interface while keeping the Ethernet interface operational. Powering off the unneeded external communications interfaces can further reduce the amount of power consumed by the networking device while in the pseudo sleep mode, while still allowing the networking device to receive the WAKE command via the external interface which remains operational.

Furthermore, in some examples the pseudo-sleep mode also comprises, in addition to powering off internal SoC modules and/or external communication interfaces, reducing the frequency of the CPU of the SoC. The power consumed by the CPU is dependent on its operating frequency, and thus reducing the frequency reduces the amount of power consumed by the CPU while still allowing the CPU to remain operational. Moreover, in some implementations the pseudo-sleep mode also comprises, in addition to powering off internal SoC modules and/or external communication interfaces, terminating user processes that are running on the CPU and preventing further user processes from starting. In particular, in some examples, all user processes are terminated/prevented except for a predetermined set of processes that are considered necessary. In some examples, the necessary processes include the wdg and init processes. The amount of power consumed by the CPU depends on how busy it is, which can depend on the number and type of user processes that are running. Thus, reducing the number of user processes running on the CPU will further reduce the amount of power consumed thereby. In some examples, pseudo sleep mode includes both reduction of CPU frequency and termination of user processes.

Turning now to the figures, various devices, systems, and methods in accordance with aspects of the present disclosure will be described.

FIG. 1 is a block diagram conceptually illustrating an example networking device 100. The networking device 100 may be, for example, a switch, a router, an access point, or any other networking device that is configured to provide communications interfaces (wireless and/or wired) to interconnect computing devices, as would be understood by those of ordinary skill in the art. Those of ordinary skill would understand that FIG. 1 is not intended to illustrate specific shapes, dimensions, or other structural details accurately or to scale. Moreover, the networking device 100 illustrated in FIG. 1 is one example and implementations of the networking device 100 may have different numbers and arrangements of the illustrated components and may also include other parts that are not illustrated.

As shown in FIG. 1, the networking device 100 comprises an SoC 110, a first external communications interface 140, and a power supply unit (PSU) 180. In some examples, the networking device 100 also comprises one or more second external communications interfaces 170.

The first and second external communications interfaces 140, 170 are configured to communicably connect the networking device 100 with other electronic devices (e.g., computing devices, other networking devices, etc.). For example, the first and/or second communications interfaces 140, 170 may include ports to receive connectors of electrical and/or optical communications cables, wireless interfaces, or any other type of physical communication interface. For example, the interfaces 140, 170 may include Ethernet interfaces comprising RJ45 ports, optical communications interfaces comprising optical transceivers, USB communications interfaces comprising USB ports, wireless communications interfaces comprising radio transceivers (e.g., a Wi-Fi interface), or any other desired physical communications interfaces. The first external communications interface 140 is distinguished from the one or more second external communications interfaces 170 (if any are present) in that the first external communications interface 140 is the interface over which a WAKE command is communicated to the networking device 100. In some examples, the first external communications interface 140 is also the interface over which a SLEEP command is communicated. (The SLEEP and WAKE commands will be described in greater detail below). For example, the first external communications interface 140 may be an interface which is connected to a network controller and over which network control and configuration commands are communicated.

The power supply unit (PSU) 180 is configured to provide electrical power to the components of the networking device 100. The PSU 180 comprises one or more power supply devices that are configured to receive input power from a source, such as mains power or a power distribution unit, and convert that power into forms suitable for use by the networking device 100. The power supply devices of the PSU 180 may include an AC-to-DC converter, a DC-to-DC converter, protection devices (e.g., over-current protection, over-voltage protection, etc.), and/or other power components that participate in, control, or otherwise facilitate the supply of power to the networking device 100. In FIG. 1, electrical power provided by the PSU 180 is indicated by dotted arrows, whereas data communication pathways are indicated by solid arrows. PSUs of a networking device are familiar to those of ordinary skill in the art, and thus the PSU 180 is not described in greater detail herein.

The SoC 110 comprises circuitry configured (e.g., programmed) to perform various operations that control the networking device 100. The SoC 110 comprises a CPU 120 and a memory 125. The CPU 120 comprises one or more processors, as would be familiar to those of ordinary skill in the art. The memory 125 may comprise volatile memory (e.g., RAM), non-volatile memory (e.g., flash memory), or both. The CPU 120 may execute instructions stored in the memory 125. The SoC 110 also comprises a number of internal SoC modules integral to the SoC 110, including an internal PHY 130 and one or more other internal SoC modules 160. The internal PHY 130 is configured to control the physical layer operations of the first external communications interface 140. For example, in the implementation in which the first external communications interface 140 is an Ethernet interface, the PHY 130 would be an Ethernet PHY. The other SoC modules 160 may comprise one or more other functional modules of the SoC, which may include modules that control the second external communications interfaces 170 (if present), modules that provide peripheral functionality, or any other SoC modules, which are familiar to those of ordinary skill in the art.

The SoC 110 also comprises pseudo-sleep mode logic 150. The pseudo-sleep mode logic 150 is configured to cause the SoC 110 to perform operations associated with a pseudo-sleep mode as described herein. In particular, in some examples, the pseudo-sleep mode logic 150 is configured to cause performance of operations 151 and 156, which will be described in greater detail below. As used herein, "logic" refers to dedicated hardware, software instructions stored in memory and coupled with a processor capable of executing the instructions, or some combination of these. Thus, in some examples the pseudo-sleep mode logic 150 comprises instructions stored in the memory 125 which are executable by the CPU 120 to cause performance of the operations 151 and 156, in some examples the pseudo-sleep mode logic 150 comprises dedicated hardware configured to perform operations 151 and 156, and in some examples the pseudo-sleep mode logic 150 comprises some combination of the foregoing.

As noted above, the pseudo-sleep mode logic 150 is configured to perform operations 151 and 156. Operation 151 comprises, in response to receiving a SLEEP command (which in some examples may be received via the first external communications interface 140), causing the networking device 100 to enter a pseudo-sleep mode. As described above, in the pseudo-sleep mode one or more of the internal SoC modules 160 (other than the CPU 120, the memory 125, and the PHY 130) are powered off. In some examples, in the pseudo-sleep mode all of the internal SoC modules 160 except for the CPU 120, the memory 125, and the PHY 130 are powered off. Moreover, in some examples, in addition to powering off internal SoC modules, in the pseudo-sleep mode one or more of the second external communications interfaces 170 (if any are present) are also powered off. In some examples, all of the second external communications interfaces 170 that are present are powered off (i.e., all external communication interfaces other than the first external communications interface 140 are powered off). These measures reduce the amount of power consumed by the networking device, while still allowing the integral PHY 130 to remain powered on and monitoring for a wake signal.

In some examples, the pseudo sleep mode according to operation 151 comprises additional power saving measures, in addition to powering off internal SoC modules 160 and/or the second external interfaces 170. For example, in some implementations the pseudo sleep mode may also comprise reducing a frequency parameter of the CPU from a normal operational value for the frequency parameter. The frequency parameter may directly or indirectly control the operational frequency of the CPU. For example, the frequency parameter may directly set the frequency, or may set a target frequency around which the actual frequency may vary, or may be a high or low endpoint of a range of frequencies within which the actual frequency varies. For example, if the CPU has a base frequency and a maximum boost frequency, the actual frequency of the CPU may vary between these two values, and in such an example the frequency parameter which is reduced in the pseudo-sleep mode may be the base frequency, the maximum (e.g., boost) frequency, or both the base and maximum (boost) frequency. Some CPUs may comprise multiple processors and/or multiple cores, and in some cases the processors and/or cores may be capable of having different frequency parameter settings. In such cases, the reduction in the frequency parameter may include a reduction in the frequency parameter for just one core or processor, for all cores or all processors, or for some combination of cores or processors.

As another example, in some implementations the pseudo sleep mode may also comprise terminating all user processes that are running at the time that the pseudo-sleep mode is entered and thereafter preventing new user processes from running throughout the duration of the pseudo-sleep mode, except for a predetermined set of processes which are deemed necessary and thus are allowed to continue and/or begin running during the pseudo-sleep mode. In some examples, the set of processes which are deemed necessary and allowed to continue running may include the init and wdg processes. These additional power saving measures can further reduce the amount of power consumed by the networking device 100, particularly by the SoC 110.

Operation 156 comprises, in response to a WAKE command (received via the first external communications interface 140), causing the networking device 100 to exit the pseudo-sleep mode (also referred to as waking up). This waking up comprises at least powering back up the second external communications interfaces 170 (if any are present), powering back up the SoC modules 160 that were previously powered off, and resuming normal operations. In examples in which the frequency of the CPU is reduced in the pseudo sleep mode, waking up may further comprise returning the CPU frequency to its normal value (or normal range). In examples in which user processes are terminated and prevented in the pseudo sleep mode, waking up may further comprise allowing user processes to begin running in the normal course and, in some cases, actively restarting or resuming processes that were terminated upon entering the sleep mode.

Figure 2:
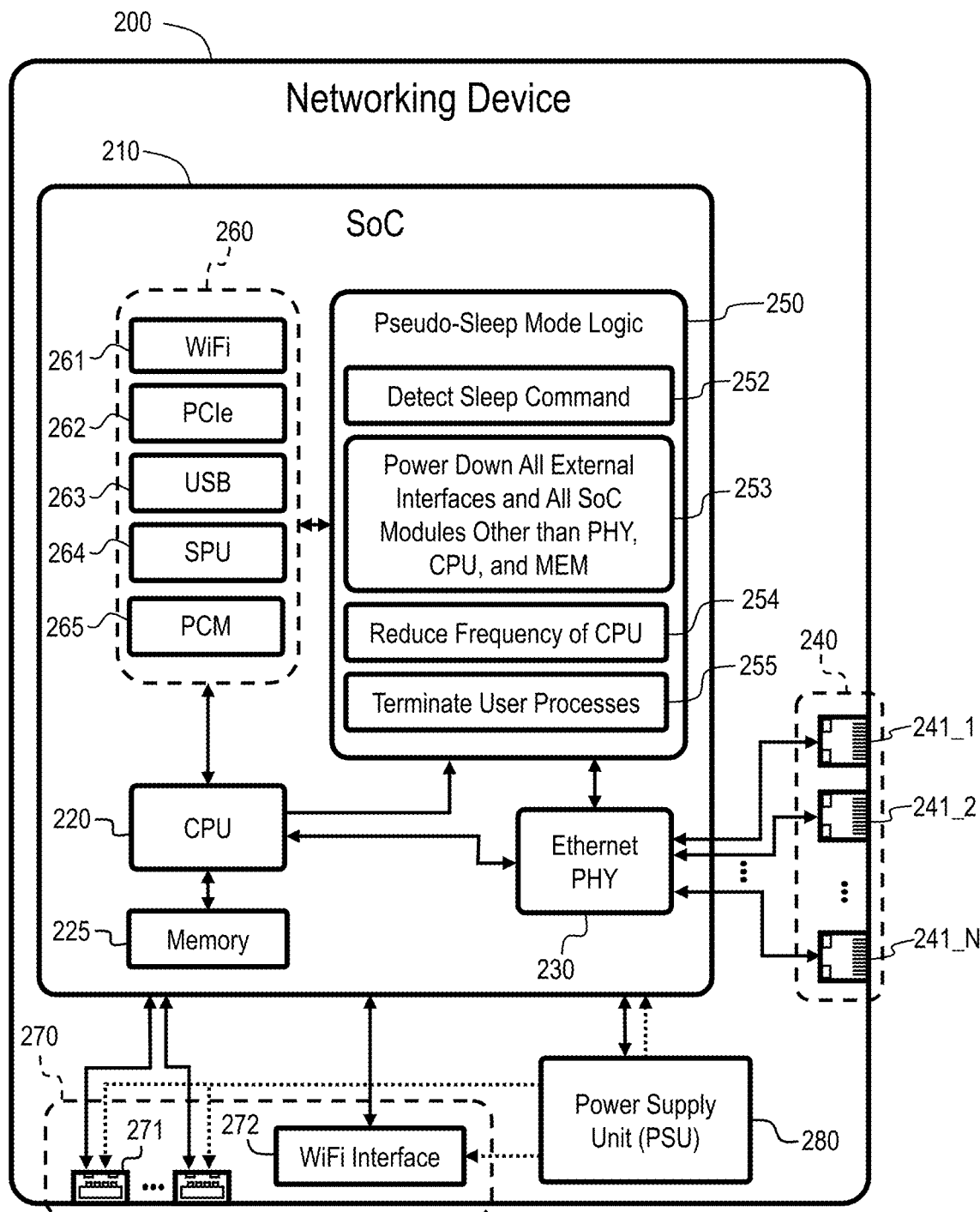
FIG. 2 is a block diagram illustrating another example networking device.

Turning now to FIG. 2, another example networking device 200 will be described. The networking device 200 is one example configuration of networking device 100. Components of the networking devices 100 and 200 that are the same as, or are similar to, one another are given reference numbers having the same last two digits, such as 110 and 210. The descriptions above of the components of the networking device 100 are applicable to the similar components of the networking device 200, and thus duplicative descriptions of some aspects of these components which were already described above are omitted below. While the networking device 200 is one example configuration of the networking device 100, the networking device 100 is not limited to the networking device 200.

As shown in FIG. 2, the networking device 200 comprises an SoC 210 (which is an example configuration of the SoC 110), a first external communications interface 240 (which is an example configuration of the first external communications interface 140), example second external communications interfaces 270 (which are example configurations of the second external communications interfaces 170), and a PSU 280 (which is similar to PSU 180).

In the example illustrated in FIG. 2, the first external communications interface 240 is an Ethernet communications interface, and thus comprises one or more ports 241 (e.g., ports 241_1 to 241_N in FIG. 2) which may each include a connector ("jack") configured to receive a complimentary connector ("plug") of an Ethernet cable. For example, the ports 241 may comprise female connectors in the form of RJ45 (also called 8P8C) jacks configured to receive complementary male connectors in the form of RJ45 (8P8C) plugs.

In the example illustrated in FIG. 2, the second communications interfaces 270 comprise a USB communication interface 271 and a Wi-Fi communication interface 272. The USB communications interface 271 comprises one or more USB ports configured to receive USB plugs, according to any of the various USB standards. The Wi-Fi communication interface 272 may comprise an antenna and associated circuitry that facilities transmission and/or reception of Wi-Fi signals via the antenna. For example, the Wi-Fi communication interface 272 may comprise part (or all) of a Wi-Fi transceiver. As another example, the Wi-Fi communication interface 272 may comprise a Wi-Fi front-end-module (FEM), which may comprise a collection of devices that amplify and route signals between the antenna and the SoC 210, such as power amplifiers, low noise amplifiers, filters, and switches.

It is noted that the configuration of first and second external communications interfaces 240 and 270 shown in FIG. 2 is merely one illustrative example, and in other examples of the networking device 100 the numbers and types of external communications interfaces provided may differ. In particular, any number of second external communications interfaces may be provided, including, zero, one, two, three, or more. Moreover, the first external communication interface is not limited to an Ethernet interface and neither are the second external communications interfaces limited to USB and/or Wi-Fi interfaces. In particular, any type of communications interface may be used as the first communications interface and any types of communications interfaces may be used as the second communications interfaces.

The SoC 210 comprises a CPU 220 and a memory 225. The SoC 110 also comprises a number of SoC modules integral to the SoC 210, including an Ethernet PHY 230 and a plurality of other SoC modules 260. The Ethernet PHY 230 is configured to control the physical layer operations of the first external communications interface 240. The other SoC modules 260 comprise a Wi-Fi module 261 which controls the Wi-Fi communications interface 272. This Wi-Fi module 261 may comprise a Wi-Fi PHY and a Wi-Fi MAC. The SoC modules 260 may further comprise a USB module 263 to control the USB interface 271. The SoC modules 260 may further comprise a Peripheral Component Interconnect Express (PCIe) module 262 to control PCIe functionality (e.g., implement the PCIe 2.0 specification Root Complex (RC)), a secure processing unit (SPU) 264 to provide cryptographic and security functionality, a Power Management Controller (PMC) module 265 to provide power management functionality, or any other SoC modules.

It is noted that the configuration of SoC modules 260 shown in FIG. 2 is merely one illustrative example, and in other examples of the networking device 100 the numbers and types of SoC modules 260 may differ. Any type of SoC module that is desired may be used, including a subset of one or more of the SoC modules 260 *e* illustrated in FIG. 2, one or more SoC modules that are not illustrated in FIG. 2, or any combination of these.

As shown in FIG. 2, the SoC 210 also comprises pseudo-sleep mode logic 250. The pseudo-sleep mode logic 250 is configured to cause the SoC 210 to perform operations associated with a pseudo-sleep mode. In particular, the pseudo-sleep mode logic 250 is configured to cause performance of operations 252 to 255, which constitute one example configuration of the operation 151 described above. The operation 252 comprises detecting receipt of a SLEEP command. For example, the operation 252 may include monitoring the first external communications interface 240 for receipt of the SLEEP command. The SLEEP command may comprise any predetermined signal which is recognized by the networking device as an instruction to enter the pseudo sleep mode. In some examples, the SLEEP command is identical to a command that can be used to cause a different networking device to enter a different form of sleep mode, such as the full sleep mode described above. In this manner, in some examples, the same single command may be used to cause the pseudo sleep mode (in devices capable of this) or the full sleep mode (in devices capable of this), depending on the capabilities and configuration of the device receiving the command. This may allow, for example, a network administrator to place multiple devices in a sleep mode via a single command without having to distinguish which devices can execute the normal sleep mode and which can execute the pseudo-sleep mode.

In response to receiving a SLEEP command, the pseudo-sleep mode logic 250 causes the networking device 200 to enter the pseudo-sleep mode, which comprises performing operations 252 to 255. In operation 252, the pseudo-sleep mode logic 250 powers down all of the second external communications interfaces 270, which in the example of FIG. 2 includes the USB interface 272 and the Wi-Fi interface 272. In addition, in operation 252 the pseudo-sleep mode logic 250 powers down all of the additional SoC modules 260 other than the CPU 220, the memory 225, and the PHY 230. In operation 254, the frequency of the CPU 220 is reduced, as described above. In operation 255, all user processes are terminated except for a predefined set of processes, as described above. In some examples, the performance of the operations 252 to 255 by pseudo-sleep mode logic 250 may correspond to the method 400 described below.

Although not illustrated, the pseudo-sleep mode logic 250 also performs operations similar to operation 156 described above, which comprises detecting a WAKE command and, in response, waking the networking device 200 by undoing/reversing the operations 252 to 255. For example, the pseudo-sleep mode logic 250 may perform operations corresponding to the method 500 described below. Like the SLEEP command, the WAKE command may comprise any predetermined signal which is recognized by the networking device as an instruction to wake from the pseudo sleep mode, and in some examples may be identical to a WAKE command used to wake different networking devices from a different form of sleep (such as the full sleep mode described above).

Figure 3:
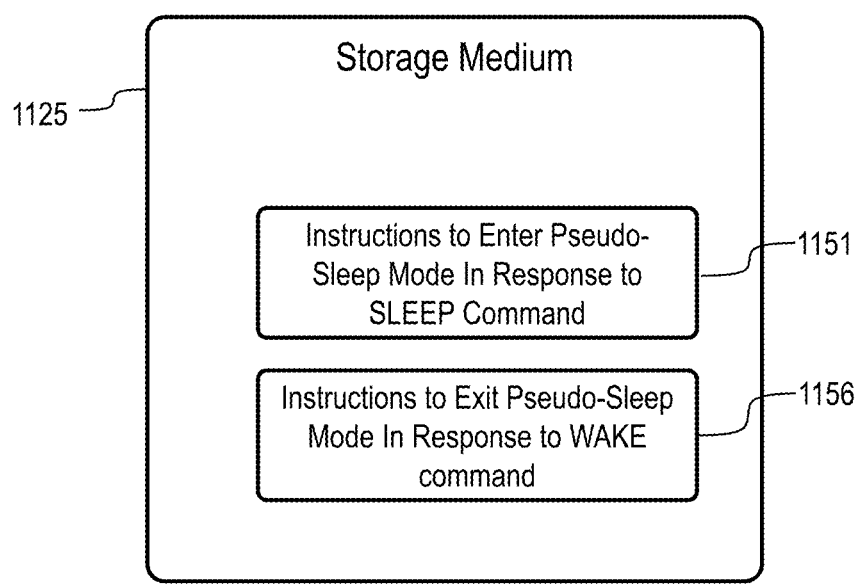
FIG. 3 is a block diagram illustrating an example computer program product.

Turning now to FIG. 3, an example computer program product is described. The computer program product comprises a non-transitory compute readable storage medium 1125 which stores instructions 1151 and 1156. These instructions 1151 and 1156 comprise computer readable instructions (e.g., software, firmware, etc.) that correspond to operations 151 and 156, respectively. In other words, instructions 1151 and 1156 are executable by one or more processor(s) of the SoC 210 (e.g., a processor of the CPU 220 and/or a processor of the PHY 230), and when execute cause the performance of the operations 151 and 156, respectively. Thus, the storage medium 1125 and the instructions 1151 and 1156 stored thereon constitute one example configuration of the pseudo-sleep mode logic 150. More specifically, instructions 1151 comprise instructions to enter the pseudo sleep mode in response to receiving a SLEEP command (similar to operations 151), whereas instructions 1156 comprise instructions to wake from the pseudo sleep mode in response to receiving a WAKE command (similar to operations 156). Although not illustrated, in some examples the instructions 1151 further include instructions corresponding to operations 252 to 255 described above.

Figure 4:
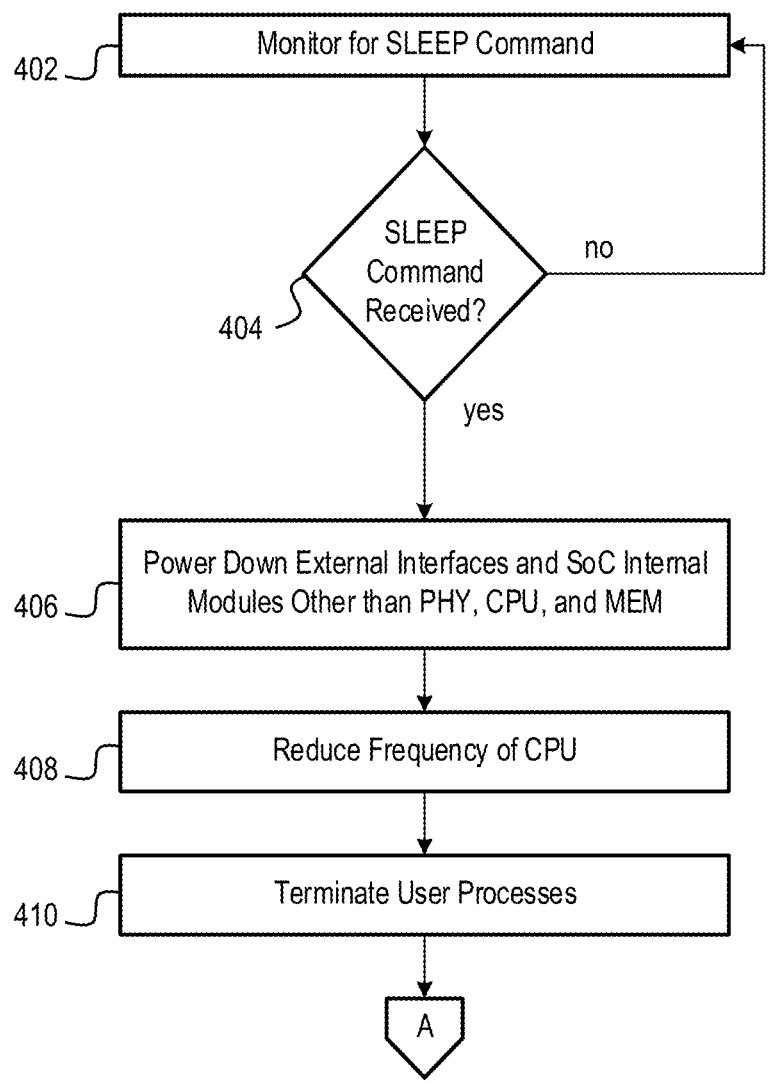
FIG. 4 is a process flow chart illustrating a first example method.

Turning now to FIG. 4, a method 400 will be described. Method 400 may be performed by pseudo sleep mode logic 150 or 250. Operations performed in method 400 correspond to one example implementations of operation 151 described above. Operations performed in method 400 also corresponds to one example implementation of operations 252 to 255 described above.

At block 402, the networking device monitors for a SLEEP command. For example, a first external communications interface may be monitored for the SLEEP command.

At block 404, it is determined whether the SLEEP command has been received. If not, the process continues down the NO branch and returns to block 402. If so, the process continues down the YES branch to block 406. Thus, blocks 402 and 404 form a loop, wherein the first external communications is continually or periodically monitored for the SLEEP command, and this loop is broken when the SLEEP command is received.

At block 406, the networking device powers down one or more (in some cases, all) external communications interfaces other than the first communications interface over which the SLEEP command was received. In addition, the networking device powers down one or more (in some cases all) of the SoC's internal modules, other than the internal PHY that controls the first communications interface, the SoC's CPU, and the SoC's memory.

At block 408, the networking device reduces the frequency of the SoC's CPU.

At block 410, the networking device terminates one or more (in some cases all) user processes running on the CPU, other than a predetermined set of processes deemed necessary (which, in some cases, includes init and wdg).

In some examples, block 408 is omitted. In some examples, block 410 is omitted. In some examples, blocks 408 and 410 are omitted.

In some examples, after completion of block 410, the method 500 illustrated in FIG. 5 may be performed, as will be described below.

Figure 5:
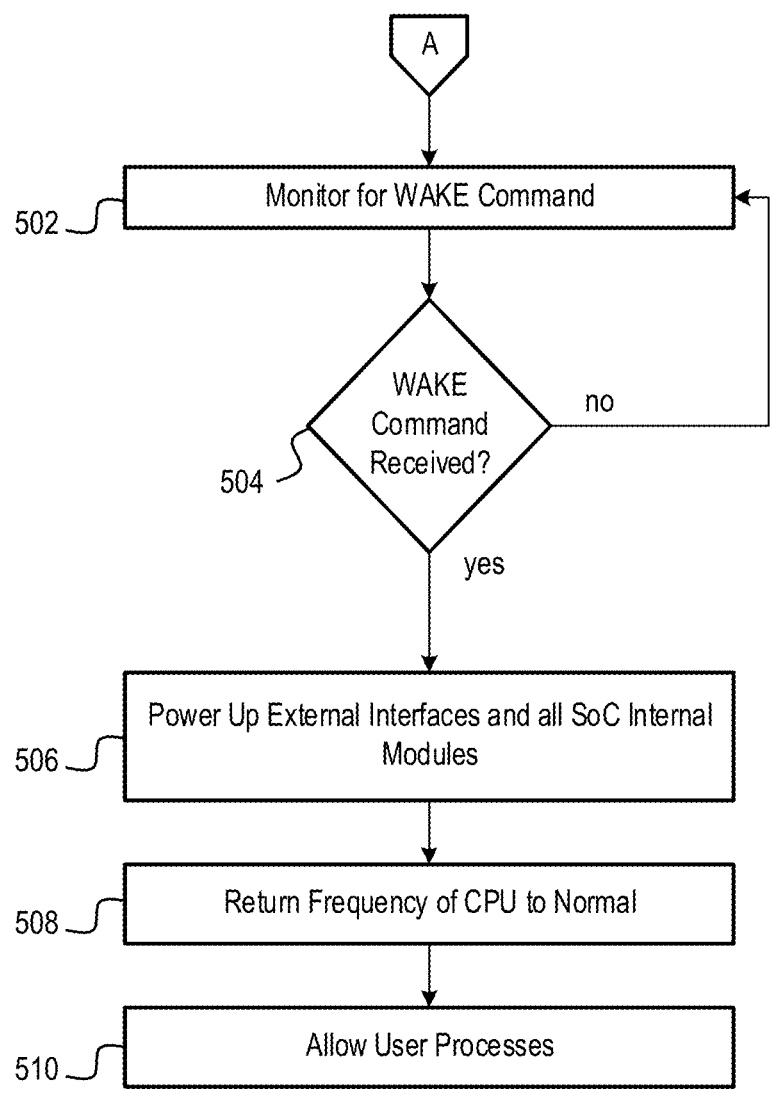
FIG. 5 is a process flow chart illustrating a second example method.

FIG. 5 illustrates the method 500, which may be performed by pseudo sleep mode logic 150 or 250. Operations performed in method 400 correspond to one example implementation of operation 156 described above. The method 500 may be performed when the networking device is in a pseudo-sleep mode, such as after the method 400 has been performed.

At block 502, the networking device monitors for a WAKE command. For example, a first external communications interface may be monitored for the WAKE command. In some examples, the signals received over the first external communications interface are received by the internal PHY (e.g., PHY 130 or 230), processed by the PHY into a form readable by the CPU, and then forwarded from the internal PHY to the CPU. Thus, the CPU and PHY may cooperate together to monitor for receipt of the WAKE command.

At block 504, it is determined whether the WAKE command has been received. If not, the process continues down the NO branch and returns to block 502. If so, the process continues down the YES branch to block 506. Thus, blocks 502 and 504 form a loop, wherein the first external communications is continually or periodically monitored for the WAKE command, and this loop is broken when the WAKE command is received.

At block 506, the networking device powers on all of the external communications interfaces and SoC modules that were previously powered off upon entering the pseudo sleep mode. In some examples, the CPU, which remained powered on in the pseudo sleep mode, may cause the communications interfaces and SoC modules to be powered back on. The memory, which also remained powered on in the pseudo sleep mode, may store the instructions executable by the CPU to cause the CPU to perform these actions.

At block 508, the networking device returns the frequency of the SoC's CPU to its normal value (or range), if the CPU frequency had previously been reduced in the pseudo sleep mode.

At block 510, the networking device ceases to prevent user processes from running on the CPU. In addition, in some examples, the networking device restores (e.g., begins execution/running of) user processes that were previously terminated upon entering of the pseudo sleep mode.

Figure 6:
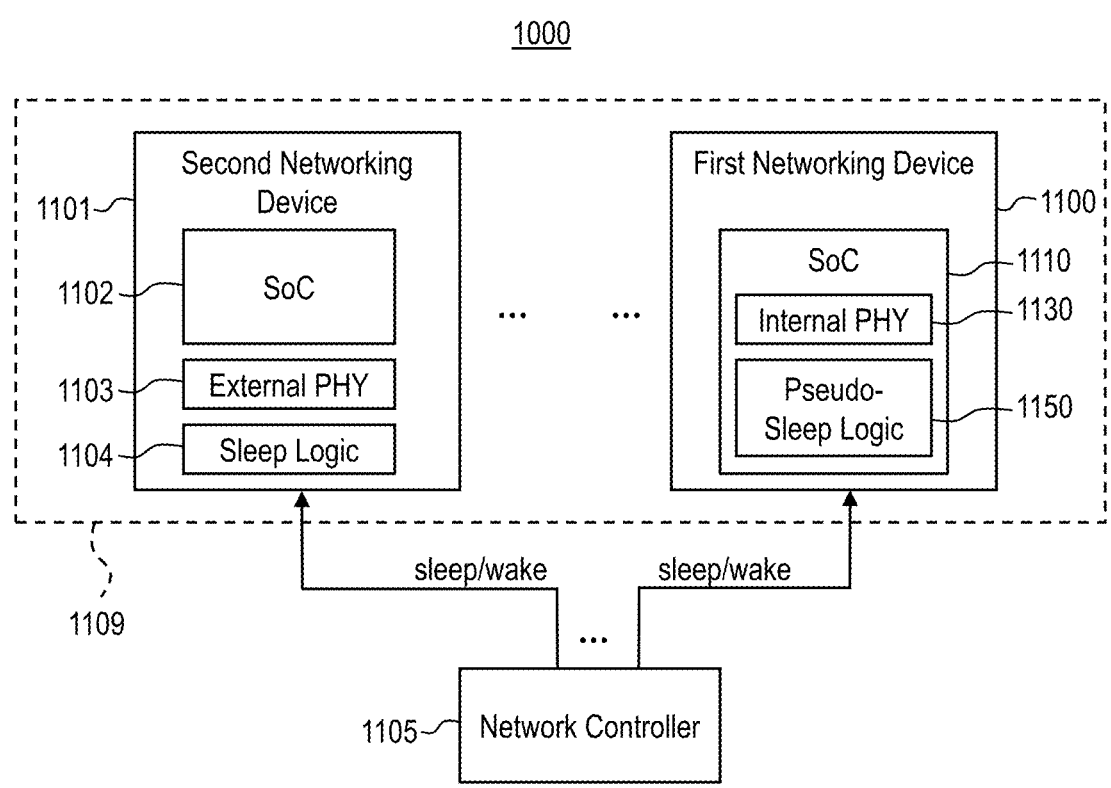
FIG. 6 is a block diagram illustrating an example system.

Turning now to FIG. 6, an example system 1000 will be described. The system 1000 comprises a network controller 1105 and a network 1109 comprising one or more first networking devices 1100 and one or more second networking devices 1101. The networking devices 1100 and 1101 are communicably connected with one another and/or with other electronic devices (not illustrated), forming the network 1109. The network controller 1105 may be a computing device which comprises a processor and a memory storing instructions, and may be configured to be usable by a networking administrator to control and configure the networking devices 1100 and 1101 in the network 1109, as would be familiar to those of ordinary skill in the art. In particular, the network controller 1105 may be configured to send SLEEP and WAKE commands to the networking devices 1100 and 1101 to cause them to enter a full sleep mode or a pseudo-sleep mode, depending on the capability of the device receiving the command. In particular, the first networking devices 1100 are configured to enter the pseudo-sleep mode in response to receiving the SLEEP command, whereas the second networking devices 1101 are configured to enter a full sleep mode in response to receiving the SLEEP command.

The first networking device(s) 1100 may each comprise one of the networking devices 100 or 200 described above. In particular, the first networking device(s) 1100 each comprise an SoC 1110 (which may be similar to SoC 110), an internal PHY 1130 that controls a communications interface over which SLEEP/WAKE commands are received from the system controller 1105 (similar to PHY 130), and pseudo-sleep logic 1150 (similar to pseudo-sleep logic 1150). The first networking device(s) 1100 may also comprise additional components described above, but which are omitted from FIG. 6 for the sake of clarity. The pseudo-sleep logic 1150 is configured to cause the first networking device 1100 to enter the pseudo-sleep mode in response to receiving the SLEEP command and to wake from the pseudo-sleep mode in response to receiving the WAKE command, as described above in relation to the networking devices 100 and 200.

The second networking device(s) 1101 each comprise an SoC 1102, an external PHY 1103 that controls a communications interface over which SLEEP/WAKE commands are received from the system controller 1105, and sleep logic 1104. Unlike the internal PHY 1130 of the first networking device(s) 1100, the external PHY 1103 of the second networking device(s) 1101 is separate from and external to the SoC 1102. Therefore, each second networking device 1101 is capable of entering a full sleep mode, which comprises completely powering down its SoC 1102. Specifically, the sleep logic 1104 is configured to cause the second networking device 1100 to enter the full sleep mode and power down the SoC 1102 in response to receiving the SLEEP command. In this full sleep mode, the external PHY 1103 remains powered on and monitors for receipt of the WAKE signal. The sleep logic 1104 is configured to wake the device from the full sleep mode in response to receiving the WAKE command.

Notably, in the system 1000 the network controller 1105 uses the same SLEEP command to cause the first and second networking devices 1100 and 1101 to enter a sleep mode, with the first networking devices 1100 entering the pseudo-sleep mode and the second networking devices 1101 entering the full sleep mode. Similarly, the network controller 1105 uses the same WAKE command to cause the first and second networking devices 1100 and 1101 to wake from their respective sleep or pseudo sleep modes. In this manner, the network controller 1105 does not necessarily need to know which networking devices have which capabilities with respect to sleep modes or to distinguish between such devices when sending out sleep and wake commands, but instead may send out the same SLEEP and WAKE commands to the entire network 1109.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of $\{A\}, \{B\}, \{C\}, \{A, B\}, \{A, C\}, \{C, B\},$ and $\{A, C, B\}$".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A networking device, comprising:
   one or more communication interfaces;
   a System-on-Chip (SoC) comprising: a processor, a memory, an internal PHY module, and one or more additional internal SoC modules; and
   pseudo-sleep mode logic configured to:
      detect receipt of a sleep command and, in response, cause the networking device to enter a pseudo-sleep mode in which at least one of the one or more additional internal SoC modules is powered off while the internal PHY module remains powered on; and
      detect receipt of a wake command while the networking device is in the pseudo-sleep mode and, in response, cause the networking device to exit the pseudo-sleep mode.

2. The networking device of claim 1,
   wherein the one or more additional internal SoC modules comprise a plurality of additional internal SoC modules; and
   wherein in the pseudo-sleep mode all of the plurality of additional internal SoC modules are powered off while the processor, the memory, and the internal PHY module remain powered on.

3. The networking device of claim 1,
   wherein the one or more communication interfaces comprise a first communication interface and one or more second communications interfaces, the first communication interface configured to receive the wake command; and
   wherein in the pseudo-sleep mode at least one of the one or more second communications interfaces is powered off while the first communication interface remains operational.

4. The networking device of claim 3,
   wherein the one or more second communications interfaces comprise a plurality of second communications interfaces; and
   wherein in the pseudo-sleep mode all of the plurality of second communications interfaces are powered off.

5. The networking device of claim 1,
   wherein in the pseudo-sleep mode a frequency parameter of the processor is reduced relative to a normal value for the frequency parameter.

6. The networking device of claim 1,
   wherein the pseudo-sleep mode logic is configured to, upon entering the pseudo-sleep mode, terminate any user processes that are running and prevent new user processes from running while in the pseudo-sleep mode, except for a predetermined set of processes.

7. The networking device of claim 6,
   wherein the predetermined set of processes comprises an init process and a wdg process.

8. The networking device of claim 1,
   wherein the one or more communication interfaces comprise a first communication interface and one or more second communications interfaces, the first communication interface configured to receive the wake command;
   wherein in the pseudo-sleep mode at least one of the one or more second communications interfaces is powered off while the first communication interface remains operational;
   wherein in the pseudo-sleep mode a frequency parameter of the processor is reduced relative to a normal value for the frequency parameter; and
   wherein the pseudo-sleep mode logic is configured to, upon entering the pseudo-sleep mode, terminate any user processes that are running and prevent new user processes from running while in the pseudo-sleep mode, except for a predetermined set of processes.

9. The networking device of claim 8,
   wherein the one or more additional internal SoC modules comprise a plurality of additional internal SoC modules and the one or more second communications interfaces comprise a plurality of second communications interfaces; and
   wherein in the pseudo-sleep mode all of the plurality of additional internal SoC modules and all of the plurality of second communications interfaces are powered off.

10. The networking device of claim 8,
    wherein the predetermined set of processes comprises an init process and a wdg process.

11. A system comprising:
    a network comprising the networking device of claim 1 and a second networking device; and
    a network controller connected to the network and configured to send a sleep command to the networking device and to the second networking device;
    wherein, in response to the sleep command, the networking device enters the pseudo-sleep mode and the second networking device enters a full sleep mode in which a system-on-chip (SoC) of the second networking device is fully powered off.

12. A non-transitory computer readable medium storing instructions executable by a processor of a networking device and configured to, when executed, cause the processor to:
    detect receipt at the networking device of a sleep command and, in response, cause the networking device to enter a pseudo-sleep mode, wherein the networking device comprises a System-on-Chip (SoC) comprising a processor, a memory, an internal PHY module, and one or more additional internal SoC modules and in the pseudo-sleep mode at least one of the one or more additional internal SoC modules is powered off while the internal PHY module remains powered on; and
    detect receipt of a wake command while the networking device is in the pseudo-sleep mode and, in response, cause the networking device to exit the pseudo-sleep mode.

13. The non-transitory computer readable medium of claim 12,
    wherein the one or more additional internal SoC modules comprise a plurality of additional internal SoC modules; and wherein in the pseudo-sleep mode all of the plurality of additional internal SoC modules are powered off while the processor, the memory, and the internal PHY module remain powered on.

14. The non-transitory computer readable medium of claim 12,
wherein the networking device comprises a first communication interface and one or more second communications interfaces, the first communication interface configured to receive the wake command; and
wherein in the pseudo-sleep mode at least one of the one or more second communications interfaces is powered off while the first communication interface remains operational.

15. The non-transitory computer readable medium of claim 14,
wherein the one or more second communications interfaces comprise a plurality of second communications interfaces; and
wherein in the pseudo-sleep mode all of the plurality of second communications interfaces are powered off.

16. The non-transitory computer readable medium of claim 12,
wherein in the pseudo-sleep mode a frequency parameter of the processor is reduced relative to a normal value for the frequency parameter.

17. The non-transitory computer readable medium of claim 12,
wherein the instructions further cause the processor to, upon entering the pseudo-sleep mode, terminate any user processes that are running and prevent new user processes from running while in the pseudo-sleep mode, except for a predetermined set of processes.

18. The non-transitory computer readable medium of claim 17,
wherein the predetermined set of processes comprises an init process and a wdg process.

19. The non-transitory computer readable medium of claim 12,
wherein the networking devices comprise a first communication interface and one or more second communications interfaces, the first communication interface configured to receive the wake command;
wherein the one or more additional internal SoC modules comprise a plurality of internal SoC modules;
wherein in the pseudo-sleep mode all of the second communications interfaces and all of the internal SoC modules are powered off while the processor, the memory, and the internal PHY module remain powered on and the first communication interface remains operational;
wherein in the pseudo-sleep mode a frequency parameter of the processor is reduced relative to a normal value for the frequency parameter; and
wherein in the pseudo-sleep mode all user processes are terminated except for a predetermined set of processes.

20. A method, comprising:
detecting, at a networking device, receipt of a sleep command and, in response, causing the networking device to enter a pseudo-sleep mode, wherein the networking device comprises a System-on-Chip (SoC) comprising a processor, a memory, an internal PHY module, and one or more additional internal SoC modules and in the pseudo-sleep mode at least one of the one or more additional internal SoC modules is powered off while the internal PHY module remains powered on; and
detecting receipt of a wake command while the networking device is in the pseudo-sleep mode and, in response, causing the networking device to exit the pseudo-sleep mode.

* * * * *